United States Patent
Katsu

(10) Patent No.: US 8,698,592 B2
(45) Date of Patent: Apr. 15, 2014

(54) BARIUM TITANATE-BASED SEMICONDUCTOR CERAMIC COMPOSITION AND PTC THERMISTOR

(75) Inventor: Hayato Katsu, Nagaokakyo (JP)

(73) Assignee: Murata Manufacturing Co., Ltd., Nagaokakyo-shi, Kyoto-Fu (JP)

( * ) Notice: Subject to any disclaimer, the term of this patent is extended or adjusted under 35 U.S.C. 154(b) by 535 days.

(21) Appl. No.: 13/069,454

(22) Filed: Mar. 23, 2011

(65) Prior Publication Data

US 2011/0169123 A1    Jul. 14, 2011

Related U.S. Application Data

(63) Continuation of application No. PCT/JP2009/067015, filed on Sep. 30, 2009.

(30) Foreign Application Priority Data

Sep. 30, 2008  (JP) ................... 2008-255338

(51) Int. Cl.
*H01C 7/00* (2006.01)

(52) U.S. Cl.
USPC ................ 338/22 R; 338/320; 338/223

(58) Field of Classification Search
USPC ........... 338/22 R, 320, 223; 252/511, 514; 501/134, 123
See application file for complete search history.

(56) References Cited

U.S. PATENT DOCUMENTS

| | | | |
|---|---|---|---|
| 5,065,274 A | 11/1991 | Berghout et al. | |
| 5,414,403 A * | 5/1995 | Greuter et al. | 338/22 R |
| 6,162,752 A * | 12/2000 | Kawamoto et al. | 501/137 |
| 6,403,513 B1 | 6/2002 | Sato et al. | |
| 6,522,238 B2 * | 2/2003 | Nagao et al. | 338/22 R |
| 7,825,054 B2 * | 11/2010 | Shimada et al. | 501/139 |
| 8,093,170 B2 * | 1/2012 | Katsu | 501/134 |

FOREIGN PATENT DOCUMENTS

| | | |
|---|---|---|
| CN | 1062049 A | 6/1992 |
| CN | 101272998 A | 9/2008 |
| JP | 56-169301 A | 12/1981 |
| JP | 05291630 A | 11/1993 |
| JP | 11102802 A | 4/1999 |
| JP | 11322415 A | 11/1999 |
| JP | 2005-255493 A | 9/2005 |
| JP | 2006179692 A | 7/2006 |
| JP | 2009256179 A | 11/2009 |

OTHER PUBLICATIONS

JP 2005-255493, machine translation, dated Sep. 22, 2005.*
JP 2006-179692, machine translation, dated Jul. 6, 2006.*

* cited by examiner

*Primary Examiner* — Kyung Lee
(74) *Attorney, Agent, or Firm* — Dickstein Shapiro LLP

(57) ABSTRACT

Provided is a barium titanate-based semiconductor ceramic composition which contains no Pb, which can have an increased Curie temperature, which exhibits slight deterioration with time, and which has high reliability, containing a barium titanate-based semiconductor ceramic represented by the composition formula $(Ba_{1-x-y-z}Sr_y(A1Bi)_xA2_z)TiO_3$, where A1 is an alkali metal element, A2 is a rare-earth element, $0.03 \leq x \leq 0.20$, $0.02 \leq y \leq 0.20$, and $0.0005 \leq z \leq 0.015$, and $x-0.10 \leq y \leq (5/4) \cdot x$. In addition, 0.01 to 0.20 molar parts of Mn per 100 molar parts of Ti is preferably added thereto.

12 Claims, 1 Drawing Sheet

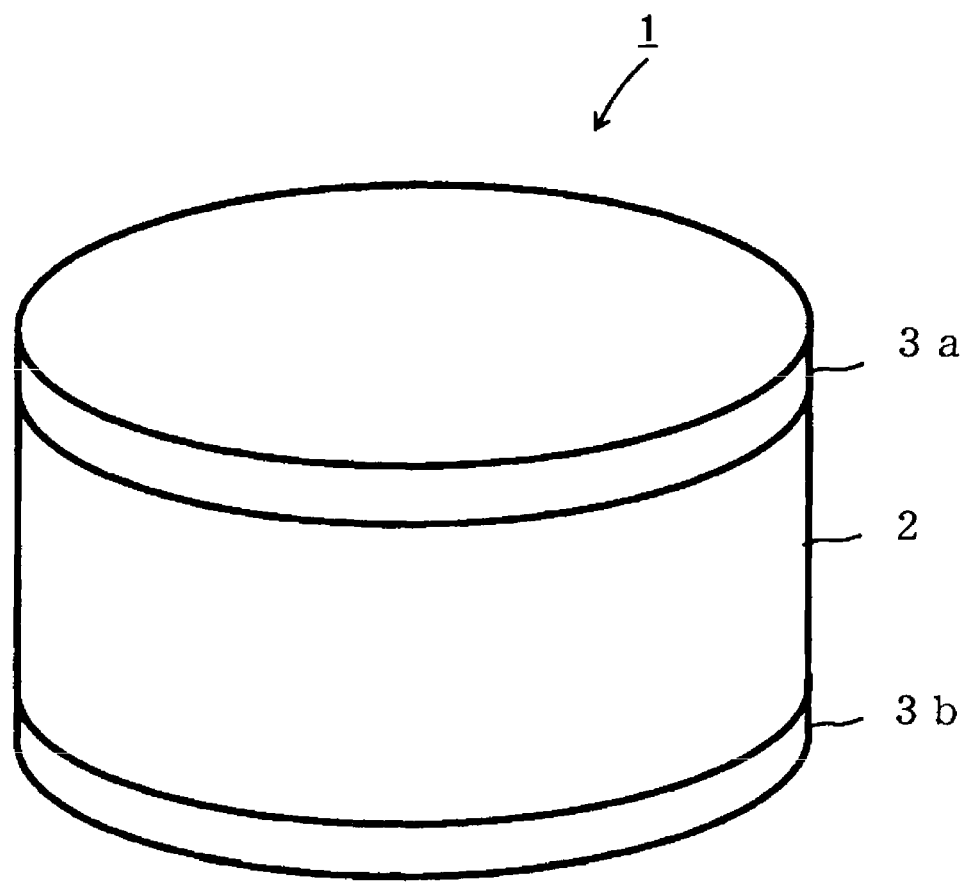

BARIUM TITANATE-BASED SEMICONDUCTOR CERAMIC COMPOSITION AND PTC THERMISTOR

This is a continuation of application Serial No. PCT/JP2009/067015, filed Sep. 30, 2009, the entire contents of which is hereby incorporated by reference.

TECHNICAL FIELD

The present invention relates to a barium titanate-based semiconductor ceramic composition which contains no Pb and which is capable of obtaining high Curie temperature and also relates to a PTC thermistor.

BACKGROUND ART

Barium titanate-based ($BaTiO_3$-based) semiconductor ceramic compositions for use in PTC thermistors are known to exhibit an abrupt increase in resistance when being heated to certain temperatures (Curie temperatures). In order that the barium titanate-based semiconductor ceramic compositions can be used at higher temperatures for applications such as thermistors for heaters and increasing the range of applications, increasing the Curie temperatures is required.

A conventional technique for obtaining an increased Curie temperature is to use a $(Ba, Pb)TiO_3$-based semiconductor ceramic composition prepared by partially replacing Ba in a barium titanate-based semiconductor ceramic composition with Pb, as disclosed in, for example, Japanese Unexamined Patent Application Publication No. 56-169301 (Patent Document 1).

However, in the case of adding Pb to the barium titanate-based semiconductor ceramic composition to increase the Curie temperature, the resulting temperature coefficient of resistance thereof is small and the composition is voltage-dependent, as disclosed in Patent Document 1. Therefore, barium titanate-based semiconductor ceramic compositions which contain no Pb and which have high Curie temperature are needed.

Among barium titanate-based semiconductor ceramic compositions having high Curie temperature for use in positive temperature coefficient thermistors, a $(Ba, Na, Bi)TiO_3$-based semiconductor ceramic composition prepared by partially replacing Ba with Na and Bi is known, as disclosed in, for example, Patent Document 1 or Japanese Unexamined Patent Application Publication No. 2005-255493 (Patent Document 2).

Patent Document 1: Japanese Unexamined Patent Application Publication No. 56-169301
Patent Document 2: Japanese Unexamined Patent Application Publication No. 2005-255493

PROBLEMS TO BE SOLVED BY THE INVENTION

The ceramic composition contains no Pb and has a high Curie temperature of 120° C. or higher. However, the ceramic composition deteriorates with time and therefore the electrical resistivity thereof tends to increase while the ceramic composition is left at high temperature for a long time.

The present invention has an object to provide a barium titanate-based semiconductor ceramic composition which contains no Pb, which can have an increased Curie temperature, which exhibits only slight deterioration with time, and which is excellent in reliability, and another object is to provide a PTC thermistor.

MEANS FOR SOLVING THE PROBLEMS

A barium titanate-based semiconductor ceramic composition according to a first embodiment of the present invention is represented by the composition formula $(Ba_{1-x-y-z}Sr_y(A1Bi)_xA2_z)TiO_3$, where A1 is an alkali metal element, A2 is a rare-earth element, and x, y, and z satisfy the following inequalities:
  $0.03 \leq x \leq 0.20$,
  $0.02 \leq y \leq 0.20$,
  $0.0005 \leq z \leq 0.015$, and
  $x - 0.10 \leq y \leq (5/4) \cdot x$.

A barium titanate-based semiconductor ceramic composition according to a second embodiment of the present invention is one prepared by adding 0.01 to 0.20 molar parts of Mn per 100 molar parts of Ti to the barium titanate-based semiconductor ceramic composition according to the first embodiment of the present invention.

A PTC thermistor according to a third embodiment of the present invention includes a ceramic body and electrodes disposed on both principal surfaces of the ceramic body that are opposed to each other. The ceramic body is made of the barium titanate-based semiconductor ceramic composition according to the first or second embodiment of the present invention.

ADVANTAGES

According to a first embodiment of the present invention, the following composition can be provided: a barium titanate-based semiconductor ceramic composition which can have a high Curie temperature of 120° C. or higher, which exhibits only slight deterioration with time even if the barium titanate-based semiconductor ceramic composition is left at high temperature for a long time, and which has high reliability.

In barium titanate-based semiconductor ceramic compositions, Ba is partially replaced with an alkali metal element such as Na and Bi. The alkali metal element and Bi scatter during calcination in some cases and Bi is more likely to scatter than the alkali metal element. When the alkali metal element is left at high temperature for a long time, Bi scatters and therefore the charge balance between $Bi^{3+}$ ions and alkali metal element ions (for example, $Na^{1+}$ ions) is disrupted; hence, the alkali metal element is likely to be released from the ceramic and react with the external electrodes of PTC thermistors to cause corrosion. This probably leads to the reduced reliability.

According to the first embodiment of the present invention, the sinterability of ceramics is improved in such a manner that Sr is added thereto within the limits of the composition formula. This is probably because the addition of Sr promotes the growth of ceramic crystal grains and allows the alkali metal element to be stably present in the ceramic crystal grains in the form of a solid solution. Therefore, the alkali metal element can be prevented from being released from the ceramic body.

According to a second embodiment of the present invention, the PTC digit (rate of change; $\log(R_{250}/R_{25})$) is increased.

According to a third embodiment of the present invention, the following thermistor is obtained: a PTC thermistor which contains no Pb or the like, which can be widely used at elevated temperatures, and which is excellent in reliability even if the PTC thermistor is left at a high temperature for a long time.

BRIEF DESCRIPTION OF DRAWINGS

FIG. 1 is a schematic perspective view of a PTC thermistor according to an embodiment of the present invention.

The barium titanate-based semiconductor ceramic compositions according to the present invention will now be described in detail. A barium titanate-based semiconductor ceramic composition according to a first embodiment of the present invention is represented by the composition formula $(Ba_{1-x-y-z}Sr_y(A1Bi)_xA2_z)TiO_3$, where A1 is an alkali metal element, A2 is a rare-earth element, and x, y, and z satisfy the following inequalities:

$0.03 \leq x \leq 0.20$,
$0.02 \leq y \leq 0.20$,
$0.0005 \leq z \leq 0.015$, and
$x-0.10 \leq y \leq (5/4) \cdot x$.

In the present invention, the Ba in the barium titanate-based semiconductor ceramic composition is partially replaced with Sr, an alkaline earth metal element, Bi, and the rare-earth element and the amount of each element is set within the specific ranges described above. This promotes the growth of ceramic crystal grains and allows, for example, the alkali metal element, such as Na, to be stably present in the ceramic crystal grains in the form of a solid solution. Therefore, the sinterability of ceramics is improved. As a result, the alkali metal element can be prevented from being released from the ceramic and the following advantage is obtained: the ceramic exhibits slight deterioration over time even if the ceramic is left at high temperature for a long time.

In the above formula, x represents the total amount of the alkali metal element and Bi. In the formula as written above, equal amounts of the alkali metal element and Bi are present. No problem occurs if the amount of the alkali metal element is slightly different from the amount of Bi, that is, the amount of the alkali metal element need not necessarily be equal to the amount of Bi. The inequality Bi/alkali metal element<1 may hold because Bi and the alkali metal element scatter during calcination in some cases and Bi is more likely to scatter than the alkali metal element. A1 represents the alkali metal element and particularly represents at least one of Na, K, and Li. A2 represents a rare-earth element and particularly represents, but is not limited to, La, Y, or the like.

To the barium titanate-based semiconductor ceramic composition according to the first embodiment of the present invention, 0.01 to 0.20 molar parts of Mn per 100 molar parts of Ti is preferably added. When the amount of Mn added thereto is less than 0.01 molar parts, a sufficient advantage cannot be obtained by the addition of Mn and therefore the PTC properties are low. When the amount thereof is greater than 0.20 molar parts, the electrical resistivity may increase.

FIG. 1 is a schematic perspective view of a PTC thermistor, according to an embodiment of the present invention, formed using the barium titanate-based semiconductor ceramic composition.

With reference to FIG. 1, the PTC thermistor 1 includes a ceramic body 2 made of the barium titanate-based semiconductor ceramic composition according to the present invention and electrodes 3a and 3b disposed on both principal surfaces of the ceramic body that are opposed to each other. Ni, Al, Cr, a Ni—Cr alloy, or the like can be used to form the electrodes 3a and 3b. The PTC thermistor 1 may have a disk shape as shown in FIG. 1 or may have a rectangular parallelepiped shape or the like. The PTC thermistor may have a multilayer structure in which a plurality of electrodes are arranged.

An exemplary method for manufacturing the PTC thermistor 1 according to the present invention is described below.

Ceramic raw materials, that is, powders of compounds of elements contained in the barium titanate-based semiconductor ceramic composition, which is a target product, are weighed so as to form a predetermined composition. The weighed powders are charged into a ball mill together with grinding media such as partially stabilized zirconia (hereinafter referred to as PSZ balls), wet-mixed, and are then pre-calcined at a predetermined temperature (for example, 1000° C. to 1200° C.), whereby a pre-calcined powder is prepared.

After the pre-calcined powder and an organic binder which is added thereto are formed into granules, a disk-shaped compact is prepared from the granules. The obtained compact is degreased and is then calcined at a predetermined temperature (for example, 1250° C. to 1400° C.) in a reducing atmosphere (for example, an oxygen concentration of, 10 ppm to 10000 ppm), whereby the ceramic body 2 is formed. Subsequently, an electrode paste is applied to the principal surfaces of the ceramic body 2 and then baked at a predetermined temperature (for example, 600° C. to 800° C.), whereby the electrodes 3a and 3b are formed. In this way, the PTC thermistor 1 according to the present invention is formed.

An illustrative preparation of a barium titanate-based semiconductor ceramic compositions according to the present invention is further described below in detail.

The following powders were weighed and compounded such that Sample Nos. 1 to 41 having compositions shown in Table 1 were obtained after calcination: powders of $BaCO_3$, $SrCO_3$, $Na_2CO_3$, $Bi_2O_3$, and $TiO_2$ that were raw materials and powers of $Y_2O_3$ and MnO that were semiconducting agents. Each compounded powder mixture was mixed with an ethanol-based solvent and a dispersant for 24 hours using PSZ balls, was dried by removing the solvent, and was then screened through a #300-mesh sieve. The screened powder mixture was heat-treated at a temperature of 800° C. to 1000° C. for two hours, whereby a calcined powder was obtained. The calcined powder was mixed with a vinyl acetate-based binder used as an organic binder, poly(ammonium carboxylate) used as a dispersant, and water for 16 hours using PSZ balls, whereby slurry was obtained. The slurry was dried and was then screened through a #300-mesh sieve, whereby a source material for pressing was obtained.

The source material was formed into a disk shape at a pressure of 1000 kgf/cm$^2$ using a uniaxial press, whereby a disk-shaped sample was obtained. After being degreased at 400° C. to 600° C. in air, the disk-shaped sample was calcined at a top temperature of 1250° C. to 1400° C. for two hours in a nitrogen atmosphere with an oxygen concentration of 100 ppm, whereby a disk-shaped thermistor body having a diameter of 12 mm and a thickness of 2 mm was obtained. Both principal surfaces of the disk-shaped sample calcined as described above were subjected to lapping and electrodes made of Ni were formed thereon by plating. A silver paste was applied thereto and was then baked at 600° C., whereby each of PTC thermistors, corresponding to Sample Nos. 1 to 41, for evaluation was obtained.

The compositions shown in Table 1 were determined by analyzing the thermistor bodies by inductively coupled plasma atomic emission spectrometry (ICP-AES).

For "electrical resistivity", a direct-current voltage of 0.1 V was applied to each evaluation sample at room temperature (25° C.), the room-temperature resistance of the evaluation sample was measured by a direct current four-terminal method, and the room-temperature resistance per unit length of the evaluation sample was calculated into an electrical resistivity ($\rho_{25}$).

For "PTC digit", the room-temperature resistance ($R_{25}$) and resistance ($R_{250}$) of the evaluation sample were measured at 25° C. and 250° C., respectively, by the same method as that used to measure the room-temperature resistance thereof and the rate ΔR of change in resistance given by the equation ΔR=log($R_{250}/R_{25}$) was used to express the "PTC digit" thereof.

For "Tc (Curie temperature)", the temperature at which the electrical resistivity ($\rho_{25}$) doubled was defined as the Curie temperature.

For "Δρ/$\rho_0$ (reliability)", each obtained PTC thermistor for evaluation was placed in a high-temperature bath at 150° C. for 1000 hours, and was then taken out of the high-temperature bath and room-temperature resistivity ($\rho_{25}$) was measured by the same method as that used to measure the pre-heating room-temperature resistivity ($\rho_{25}$). "Δρ/$\rho_0$ (reliability)" was defined as the rate (($\rho_{25}'-\rho_{25})/\rho_{25}$) of change in room-temperature resistivity of the PTC thermistor before and after placement in the high-temperature bath. This index indicates reliability. A larger index indicates that reliability is less sufficient.

The samples having an electrical resistivity of 100 Ω·cm or more, a PTC digit of less than 3.0, a Tc of lower than 120° C., or a reliability of 30% or more were herein determined to be outside the scope of the present invention.

As is clear from Table 1, Sample Nos. 2 to 4, 7 to 12, 16, 17, 20 to 23, 26 to 32, and 36 to 40 have an electrical resistivity of less than 100 Ω·cm, a PTC digit of 3.0 or more, a Tc of 120° C. or higher, and a reliability of less than 30%.

On the other hand, the content of Sr in Sample No. 1 is 0, and the sinterability of ceramics is insufficient and Δρ/$\rho_0$ is 53%, that is, the reliability is extremely low. The content of Sr in Sample No. 5 is 0.15 molar parts per 100 molar parts of Ti and therefore is large; Sr probably acts as a low-temperature shifter to exhibit a significant influence. Therefore, Tc is lower than the Curie temperature (120° C.) of pure $BaTiO_3$.

The total amount of Na and Bi in Sample No. 6 is 0.02 molar parts per 100 molar parts of Ti and therefore is small; Δρ/$\rho_0$ is 67%, that is, the reliability is low. Furthermore, the PTC digit is 2.7 and therefore is small. The total amount of Na and Bi in Sample No. 13 is 0.24 molar parts per 100 molar parts of Ti and therefore is large. This sample contains an excessive amount of Na and Bi, the electrical resistivity is 245 Ω·cm and therefore is high and Δρ/$\rho_0$ is 32%, that is, the reliability is low.

Sample Nos. 14 to 24 provide data showing the relationship between the total amount of Na and Bi and the content of Sr.

TABLE 1

| Samples | ($Ba_{1-x-y-z}Sr_y(A1Bi)_xA2_z$)$TiO_3$ | | | | | Mn molar parts per 100 molar parts of Ti | Electrical resistivity (Ω·cm) | PTC digit | Tc (°C.) | Δρ/$\rho_0$ (%) |
|---|---|---|---|---|---|---|---|---|---|---|
| Sample Nos. | Ba 1 − x − y − z | Sr y | (Na + Bi) x | | Y z | | | | | |
| | | | Na | Bi | | | | | | |
| *1  | 0.898 | 0.00 | 0.05  | 0.05  | 0.002  | 0.05 | 42   | 4.6 | 179 | 53 |
| 2   | 0.868 | 0.03 | 0.05  | 0.05  | 0.002  | 0.05 | 40   | 5.1 | 167 | 24 |
| 3   | 0.848 | 0.05 | 0.05  | 0.05  | 0.002  | 0.05 | 35   | 5.3 | 158 | 17 |
| 4   | 0.798 | 0.10 | 0.05  | 0.05  | 0.002  | 0.05 | 20   | 5   | 140 | 6  |
| *5  | 0.748 | 0.15 | 0.05  | 0.05  | 0.002  | 0.05 | 23   | 5.6 | 119 | 23 |
| *6  | 0.958 | 0.02 | 0.01  | 0.01  | 0.002  | 0.05 | 8    | 2.7 | 126 | 67 |
| 7   | 0.948 | 0.02 | 0.015 | 0.015 | 0.002  | 0.05 | 12   | 3.4 | 132 | 26 |
| 8   | 0.938 | 0.02 | 0.02  | 0.02  | 0.002  | 0.05 | 26   | 4.7 | 134 | 27 |
| 9   | 0.898 | 0.02 | 0.04  | 0.04  | 0.002  | 0.05 | 30   | 5.3 | 157 | 23 |
| 10  | 0.798 | 0.05 | 0.08  | 0.08  | 0.002  | 0.05 | 37   | 5.2 | 181 | 14 |
| 11  | 0.718 | 0.10 | 0.09  | 0.09  | 0.002  | 0.05 | 47   | 5.3 | 178 | 6  |
| 12  | 0.678 | 0.12 | 0.10  | 0.10  | 0.002  | 0.05 | 68   | 5.4 | 185 | 8  |
| *13 | 0.608 | 0.15 | 0.12  | 0.12  | 0.002  | 0.05 | 245  | 4.2 | 185 | 32 |
| *14 | 0.818 | 0.03 | 0.075 | 0.075 | 0.002  | 0.05 | 58   | 3.4 | 185 | 55 |
| *15 | 0.808 | 0.04 | 0.075 | 0.075 | 0.002  | 0.05 | 50   | 4.7 | 184 | 43 |
| 16  | 0.798 | 0.05 | 0.075 | 0.075 | 0.002  | 0.05 | 37   | 5.2 | 181 | 14 |
| 17  | 0.788 | 0.06 | 0.075 | 0.075 | 0.002  | 0.05 | 20   | 5.2 | 174 | 17 |
| *18 | 0.778 | 0.04 | 0.09  | 0.09  | 0.002  | 0.05 | 63   | 5.3 | 195 | 62 |
| *19 | 0.758 | 0.06 | 0.09  | 0.09  | 0.002  | 0.05 | 78   | 5.4 | 190 | 47 |
| 20  | 0.738 | 0.08 | 0.09  | 0.09  | 0.002  | 0.05 | 87   | 4.6 | 185 | 23 |
| 21  | 0.718 | 0.10 | 0.09  | 0.09  | 0.002  | 0.05 | 47   | 5.3 | 178 | 10 |
| 22  | 0.648 | 0.15 | 0.10  | 0.10  | 0.002  | 0.05 | 75   | 5.4 | 161 | 19 |
| 23  | 0.598 | 0.20 | 0.10  | 0.10  | 0.002  | 0.05 | 69   | 5.3 | 140 | 24 |
| *24 | 0.548 | 0.25 | 0.10  | 0.10  | 0.002  | 0.05 | 93   | 5.6 | 117 | 30 |
| *25 | 0.850 | 0.05 | 0.05  | 0.05  | 0.0001 | 0.05 | 324  | 4.9 | 160 | 9  |
| 26  | 0.850 | 0.05 | 0.05  | 0.05  | 0.0005 | 0.05 | 93   | 5   | 154 | 18 |
| 27  | 0.849 | 0.05 | 0.05  | 0.05  | 0.001  | 0.05 | 68   | 5.6 | 157 | 26 |
| 28  | 0.849 | 0.05 | 0.05  | 0.05  | 0.001  | 0.05 | 35   | 5.3 | 158 | 17 |
| 29  | 0.845 | 0.05 | 0.05  | 0.05  | 0.005  | 0.05 | 45   | 5   | 150 | 20 |
| 30  | 0.842 | 0.05 | 0.05  | 0.05  | 0.008  | 0.05 | 36   | 4.6 | 153 | 23 |
| 31  | 0.840 | 0.05 | 0.05  | 0.05  | 0.01   | 0.05 | 33   | 4.1 | 155 | 24 |
| 32  | 0.835 | 0.05 | 0.05  | 0.05  | 0.015  | 0.05 | 79   | 3   | 158 | 26 |
| *33 | 0.830 | 0.05 | 0.05  | 0.05  | 0.02   | 0.05 | 266  | 2.3 | 174 | 18 |
| **34| 0.848 | 0.05 | 0.05  | 0.05  | 0.002  | 0    | 22   | 2.1 | 161 | 34 |
| **35| 0.848 | 0.05 | 0.05  | 0.05  | 0.002  | 0.001| 24   | 2.3 | 162 | 29 |
| 36  | 0.848 | 0.05 | 0.05  | 0.05  | 0.002  | 0.01 | 27   | 3.4 | 158 | 15 |
| 37  | 0.848 | 0.05 | 0.05  | 0.05  | 0.002  | 0.03 | 30   | 4.6 | 155 | 14 |
| 38  | 0.848 | 0.05 | 0.05  | 0.05  | 0.002  | 0.06 | 38   | 5.3 | 153 | 17 |
| 39  | 0.848 | 0.05 | 0.05  | 0.05  | 0.002  | 0.10 | 7    | 6   | 152 | 28 |
| 40  | 0.848 | 0.05 | 0.05  | 0.05  | 0.002  | 0.20 | 96   | 5.4 | 155 | 25 |
| **41| 0.848 | 0.05 | 0.05  | 0.05  | 0.002  | 0.50 | 1245 | 4.6 | 156 | 36 |

*indicates those outside the scope of the first embodiment.
**indicates those outside the scope of the second embodiment.

Sample Nos. 14, 15, 18, and 19 show that $\Delta\rho/\rho_0$ is greater than 40%, that is, the reliability is deteriorated when the content of Sr is relatively small with respect to the total content of Na and Bi. This data shows that the difference between the total content of Na and Bi and the content of Sr needs to be not greater than 10% by mole (10 molar parts per 100 molar parts of Ti) when the total content of Na and Bi is excessive. Since Sample No. 24 has a large Sr content, Sr probably acts as a low-temperature shifter to exhibit a significant influence. Therefore, Tc is lower than the Curie temperature (120° C.) of pure $BaTiO_3$. According to findings of the inventors, the addition of Na and Bi to materials according to the present invention probably increases the Curie temperature thereof by about +5° C./% by mole. The inventors have found that the addition of Sr thereto reduces the Curie temperature thereof by about −4° C./% by mole. From this viewpoint, when the content (y) of Sr and the total content (x) of Na and Bi satisfy the inequality $x-0.10 \leq y \leq (5/4) \cdot x$, a PTC thermistor having high Curie temperature and high reliability can be provided.

Since the content of Y, which is a rare-earth element, in Sample No. 25 is 0.0001 molar parts per 100 molar parts of Ti and therefore is small, the electrical resistivity is 324 Ω·cm and therefore is high. This shows that a sufficient semiconductor effect has not been obtained. Since the content of Y, which is a rare-earth element, in Sample No. 33 is 0.02 molar parts per 100 molar parts of Ti and therefore is large, the electrical resistivity is 266 Ω·cm and therefore is high and the PTC digit is small.

Since the content of Mn in Sample No. 34 or 35 is 0 or 0.001 molar parts, respectively, per 100 molar parts of Ti, the effect of the addition of Mn is not sufficiently exerted or sufficient PTC properties are not obtained. Since the content of Mn in Sample No. 41 is 0.50 molar parts per 100 molar parts of Ti, the electrical resistivity is significantly increased. Since the content of Mn in each of Sample Nos. 36 to 40 is within a range from 0.01 to 0.2 molar parts per 100 molar parts of Ti, the PTC digit is 3.0 or more and therefore is preferred.

In the case of partially replacing Ba in a barium titanate-based semiconductor ceramic composition with Sr, the Curie temperature thereof is known to generally shift to lower temperature. Therefore, Sr is usually used as a low-temperature shifter. However, for Sample Nos. 10 to 12, 16, 17, 20, and 21, barium titanate-based semiconductor ceramic compositions have a Curie temperature substantially equal to (±5° C.) or higher than that of pure $BaTiO_3$ (Sample 1). Therefore, it is more preferred that $0.15 \leq x \leq 0.20$, $0.05 \leq Y \leq 0.12$, $0.0005 \leq z \leq 0.015$, and $x-0.10 \leq y \leq (5/4) \cdot x$.

The invention claimed is:

1. A barium titanate-based semiconductor ceramic composition comprising a barium titanate-based semiconductor ceramic represented by the composition formula

$(Ba_{1-x-y-z}Sr_y(A1Bi)_x A2_{2z})TiO_3$ where
A1 is an alkali metal element,
A2 is a rare-earth element,
The molar ratio of A1 to B1 is 1 plus or minus 10%,
$0.03 \leq x \leq 0.20$,
$0.02 \leq y \leq 0.20$,
$0.0005 \leq z \leq 0.015$, and
$x-0.10 \leq y \leq (5/4) \cdot x$.

2. A barium titanate-based semiconductor ceramic composition according to claim 1 in which $0.04 \leq x \leq 0.18$, $0.03 \leq y \leq 0.15$, and $0.001 \leq z \leq 0.010$.

3. A barium titanate-based semiconductor ceramic composition according to claim 2 containing 0.01 to 0.20 molar parts of Mn per 100 molar parts of Ti in the barium titanate-based semiconductor ceramic.

4. A barium titanate-based semiconductor ceramic composition according to claim 3 containing 0.03 to 0.10 molar parts of Mn per 100 molar parts of Ti in the barium titanate-based semiconductor ceramic.

5. A barium titanate-based semiconductor ceramic composition according to claim 1 containing 0.01 to 0.20 molar parts of Mn per 100 molar parts of Ti in the barium titanate-based semiconductor ceramic.

6. A barium titanate-based semiconductor ceramic composition according to claim 5 containing 0.03 to 0.10 molar parts of Mn per 100 molar parts of Ti in the barium titanate-based semiconductor ceramic.

7. A PTC thermistor comprising:
a ceramic body; and
a pair of electrodes disposed on principal surfaces of the ceramic body that are opposed to each other,
wherein the ceramic body is made of the barium titanate-based semiconductor ceramic composition according to claim 6.

8. A PTC thermistor comprising:
a ceramic body; and
a pair of electrodes disposed on principal surfaces of the ceramic body that are opposed to each other,
wherein the ceramic body is made of the barium titanate-based semiconductor ceramic composition according to claim 5.

9. A PTC thermistor comprising:
a ceramic body; and
a pair of electrodes disposed on principal surfaces of the ceramic body that are opposed to each other,
wherein the ceramic body is made of the barium titanate-based semiconductor ceramic composition according to claim 4.

10. A PTC thermistor comprising:
a ceramic body; and
a pair of electrodes disposed on principal surfaces of the ceramic body that are opposed to each other,
wherein the ceramic body is made of the barium titanate-based semiconductor ceramic composition according to claim 3.

11. A PTC thermistor comprising:
a ceramic body; and
a pair of electrodes disposed on principal surfaces of the ceramic body that are opposed to each other,
wherein the ceramic body is made of the barium titanate-based semiconductor ceramic composition according to claim 2.

12. A PTC thermistor comprising:
a ceramic body; and
a pair of electrodes disposed on principal surfaces of the ceramic body that are opposed to each other,
wherein the ceramic body is made of the barium titanate-based semiconductor ceramic composition according to claim 1.

* * * * *